June 9, 1964     G. WHITEMORE ETAL     3,136,933
INTERPOLATING MECHANISM FOR THE AUTOMATIC CONTROL OF MACHINE TOOLS
Filed Feb. 21, 1961
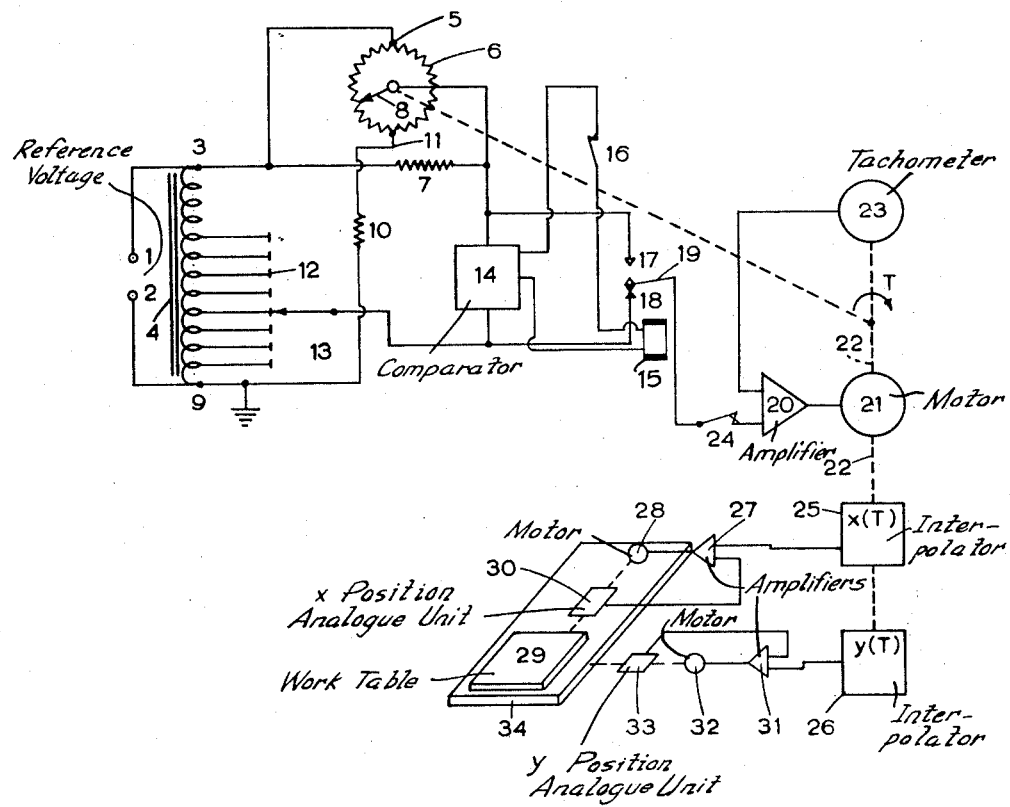

United States Patent Office 3,136,933
Patented June 9, 1964

3,136,933
INTERPOLATING MECHANISM FOR THE AUTOMATIC CONTROL OF MACHINE TOOLS
Gerald Whitemore, 347 Lansbury Drive, Hayes, England, and Donald Ernest Tyzack, Spinelle, Narcot Lane, Chalfont St. Giles, Buckinghamshire, England
Filed Feb. 21, 1961, Ser. No. 90,660
Claims priority, application Great Britain Feb. 23, 1960
8 Claims. (Cl. 318—28)

This invention relates to automatic control mechanisms for machine tools.

In the specification of United States Patent No. 2,929,555 there is described an interpolating device, especially for an automatic control mechanism for a machine tool, comprising means for deriving first input signals representing values of a first co-ordinate of successive reference points defining a locus, means for deriving second input signals representing values of a second co-ordinate of successive reference points defining said locus, first interpolating means responsive to said first input signals for generating first output signals representing intermediate values of said first co-ordinate, second interpolating means responsive to said second input signals for generating second output signals representing intermediate values of said second co-ordinate said first and second interpolating means being arranged to generate respective output signals as curvilinear functions of a non-geometric parameter. It has been proposed to use this device to provide a gradual acceleration from rest or retardation to rest of the rate of description of the locus on a linear path by a suitable choice of reference points although using a constant rate for the parameter.

It is frequently required to increase or decrease the cutting speed as, for example, when starting from rest or before and after a sharp corner, and the use of specially programmed reference points to provide acceleration and retardation over a span, results in a considerable waste of time when the control system is used with modern machine tools capable of far greater accelerations and retardations, especially those with hydraulic positioning of the table.

It is therefore the object of the present invention to provide means for accelerating and retarding the rate of description of the locus within a shorter period than that required to describe a span.

According to the present invention there is provided apparatus for controlling the displacement of a cutter relative to a workpiece on a machine tool comprising an interpolating device which produces output signals representative of successive points of the locus of the cutter relative to the workpiece corresponding to successive values of the interpolation variable, means for varying the interpolation variable at a rate responsive to a signal, derived selectively from a variable source or from one or more sources of fixed value.

In order that the invention may be clearly understood and readily carried into effect, it will now be described with reference to the single figure of the accompanying drawing.

Alternating voltage of constant amplitude from a reference source is applied between the terminals 1 and 2. The terminal 1 is connected to terminal 3 of the tapped autotransformer 4, to terminal 5 of potentiometer 6 and via resistor 7 to the wiper 8 of potentiometer 6. The terminal 2 is connected to earth, to terminal 9 of the autotransformer 4 and via resistor 10 to the terminal 11 of the potentiometer 6. The tappings of the autotransformer 4 are connected to the contacts of a switch 12. The wiper 8 of the potentiometer 6 and the wiper 13 of the switch 12 are connected to the two inputs of a comparator circuit 14, the output of which is connected to the operating coil of a relay 15 via switch 16. The contact 17 of the relay 15 is connected to the wiper 8, the contact 18 of the relay 15 is connected to the wiper 13, and the armature 19 of the relay 15 is connected to one input of the differential servo amplifier 20, via a switch 24.

The output of the amplifier 20 is fed to the motor 21 driving the shaft 22. The shaft 22 is coupled to the switch of the interpolators 25 and 26 generating the intermediate values $x(T)$ and $y(T)$ respectively of the locus, where T is the interpolation variable. The interpolators may be constructed as described in the aforesaid United States Patent No. 2,929,555, in which case the angular displacement of the shaft is representative of the magnitude of the variable T. The shaft 22 is also coupled to a tachometer 23 and to the wiper 8 of the potentiometer 6. The output of tachometer 23 is connected to the second input of the amplifier 20.

In the simple arrangement illustrated the programme may be prepared so that the switch 16 is only closed at the beginning of the selected half spans of the interpolators 25 and 26 during which it is desired to accelerate or retard the rate of the interpolation parameter T, and opened at the end of the half span.

The output of interpolator 25 is connected to one input of servo amplifier 27 which controls motor 28 driving the worktable 29 in the $x$ direction. The position analogue unit 30 is also coupled to the worktable 29 and supplies a feedback signal to the servo amplifier 27 representative of the actual displacement of the worktable in the $x$ direction. Similarly, the output of interpolator 26 is fed to one input of servo amplifier 31 which controls the motor 32 driving the slide 34 in the $y$ direction, the slide being arranged to carry the worktable 29 and the components 28 and 30. A position analogue unit 33 is coupled to the worktable 29 and supplies a feedback signal to the servo-amplifier 31 representative of the actual displacement of the slide 34 in the $y$ direction.

Suppose that it is desired to start the machine tool from rest. The adjustment of the switches in the interpolators 25 and 26 relative to the wiper 8 is such that the wiper 8 of the potentiometer 6 is connected to the point 11 at the beginning of every span of the interpolators 25 and 26. Before starting the machine tool, the switch 16 is closed and the wiper 13 of the switch 12 is connected to the contact of the switch representing the desired speed of operation of the interpolators 25 and 26. In this condition the voltage of the wiper 8 is initially determined only by the resistor 10 and is less than the voltage of the wiper 13, whatever the setting of the latter, so that the comparator 14 energizes the relay winding 15 via the switch 16 causing the moving contact 19 of the relay to be connected to contact 17. Therefore, the voltage of wiper 8 is applied to the amplifier 20, the switch 24 being closed, and the velocity servo loop comprised by the amplifier 20, the motor 21, the shaft 22 and tachometer 23, causes the shaft 22 to rotate at the speed corresponding to the voltage of wiper 8. The resistor 10 supplies a small creep voltage to the amplifier 20, via the wiper 8, because if the voltage were zero the shaft 22 would not move at all, and the description of the locus would never begin.

As the shaft 22 rotates under the influence of the creep voltage, the wiper 8 moves clockwise round the potentiometer 6 thus supplying an increasing voltage via the amplifier 20 to the motor 21 which accelerates driving the wiper 8 at higher speed and so on. When the voltage on the wiper 8 equals the voltage in wiper 13, the comparator 14 ceases to energise the relay winding 15, allowing the armature 19 to connect with the contact 18, so that the shaft 22 is caused to rotate at a steady speed determined by the tapping to which the wiper 13 is connected. Acceleration must always take place during the first half of a span, because the wiper 8 travels from point 11 to point 5 only during the first halves of spans and completes the circuit during the second halves.

At the end of the first half span of the locus when the wiper 8 is connected to the point 5, the switch 16 is opened so that the shaft 22 continues at the demanded speed for the remainder of the span and the subsequent spans. The switch 16 remains open during all the spans after the first half which are to be cut at the rate of change of the interpolation variable T, demanded by a particular setting of the wiper 13.

When it is required to slow the cutter, as for example at a sharp corner, the retardation must take place during the second half of a span whilst the wiper 8 moves from point 5 to point 11. At the middle of the selected span the switch 16 is closed, so that when the voltage of wiper 13 exceeds the voltage on wiper 8, the comparator 14 energises the relay winding 15, connecting the armature 19 to contact 17. In this way, as the shaft 22 rotates towards the end of the selected span, it rotates progressively more slowly under the command of the voltage on wiper 8 until the end of the span is reached. The switch 24 may be opened stopping the shaft 22 altogether. The switch 24 is also controlled by the programme. At this point a brake may be applied to the shaft 22.

If the potentiometer 6 is linear and used without resistor 7 the acceleration and retardation is exponential, but the use of the resistor 7 connected as shown gives a non-linear characteristic for variation of the potentiometer 6 and thus would achieve more nearly constant acceleration or retardation.

Alternative to the use of the resistor 7, the potentiometer 6 could be wound non-linearly.

It may be found desirable to use logarithmically spaced tappings on the transformer 4, so that there is a constant ratio between adjacent tappings and the respective speeds of the shaft 22.

The comparator 14 may conveniently consist of a phase sensitive rectifier circuit which produces an output signal only when the signal at the wiper 13 is larger than the signal at the wiper 8.

The connections between the contacts 17 and 18, and the armature 19 should be of the make-before-break type.

In a modified arrangement, the wiper 8 of the potentiometer 6 may be driven by a separate motor, in which case there would be no need to provide a creep voltage, and the potentiometer 6 would be linear to provide constant acceleration of the shaft 22. This separate motor could be switched on at the beginning of any span in which acceleration or retardation were required, timing means being provided to ensure that the wiper 8 reached the point 11 at the end of the span and not before or after.

What we claim is:

1. Automatic control apparatus suitable for controlling the displacement of a cutter relative to a workpiece in a machine tool, comprising a device which produces output signals representative of values of at least one co-ordinate of successive points of a locus of the cutter relative to the workpiece corresponding to successive values of a parameter, said device including motive means responsive to a rate signal representing the rate of variation of said parameter for determining the rate of production of said output signals, a first signal source operative synchronously with said motive means for producing a first rate signal which is variable smoothly from one fixed limit to another, a second signal source which can be preset to produce one of a number of fixed rate signals each within said limits, a selector switch for applying said variable rate signal to said motive means as rate signal therefor when the two rate signals have one relationship and for applying the fixed rate signal to said motive means as the rate signal therefor when said rate signals have a different relationship and means for disabling said selector means and applying said fixed rate signal to said motive means as rate signal therefor, independently of the relationship between said rate signals.

2. Apparatus according to claim 1, comprising a shaft, the position of which represents said parameter and to which said device is coupled, said motive means for varying the parameter comprises a motor driving said shaft, and said first signal source is operated in response to the position of said shaft.

3. Apparatus according to claim 1 wherein said first signal source comprises a potentiometer which is energized by an electrical source of fixed value, and the wiper of said potentiometer is driven by said shaft, said motor being selectively responsive to the voltage of said wiper.

4. Apparatus according to claim 3 wherein said selector switch is responsive to the signals from said first signal source and said second signal source so that said rate signal is derived either from said first signal source or from said second signal source depending on the relative magnitude of signals from said first signal source and from the second signal source.

5. Apparatus according to claim 4 wherein said selector switch comprises a relay, operated by the difference between the signals from said first and second signal sources.

6. Apparatus according to claim 3 comprising a tachogenerator coupled to said shaft, said motor being powered by a signal derived from the difference between the voltage of said wiper and a signal from said tachogenerator, whereby the speed of said shaft is proportional to the voltage of said wiper.

7. Apparatus according to claim 4 comprising a record and said means for selectively disabling said selector switch is responsive to said record.

8. Apparatus according to claim 3 wherein said potentiometer is arranged to be non-linear whereby the acceleration or retardation of said shaft due to said motor when said motor is responsive to the voltage of said wiper is maintained at a value which is more nearly constant than it would be if said potentiometer was linear.

References Cited in the file of this patent

UNITED STATES PATENTS

| | | |
|---|---|---|
| 2,660,700 | Gates | Nov. 24, 1953 |
| 2,889,506 | Fogiel | June 2, 1959 |
| 2,944,737 | Cail et al. | July 12, 1960 |